United States Patent Office 3,351,300
Patented Nov. 7, 1967

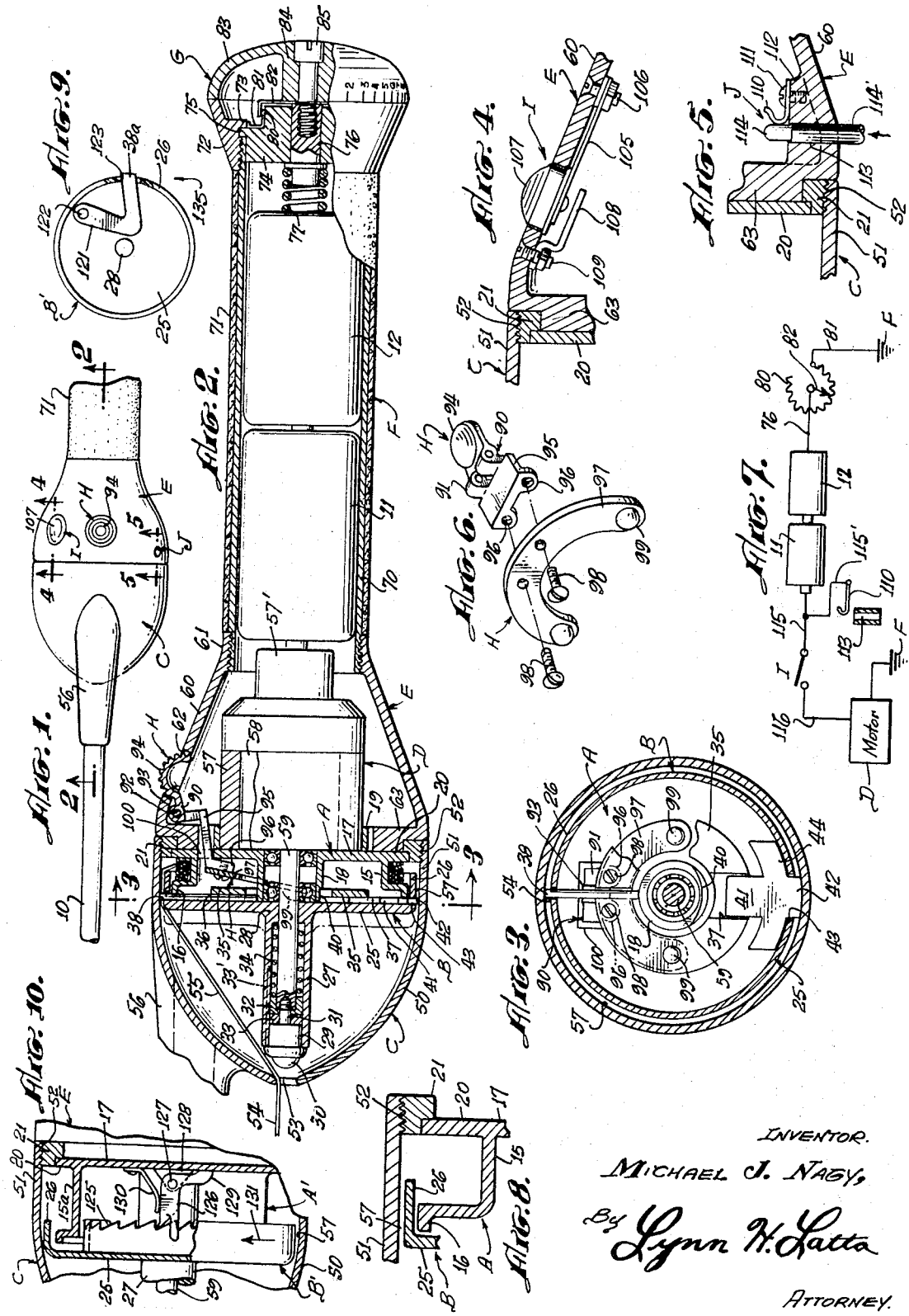

3,351,300
SPINNING TYPE FISHING REEL
Michael John Nagy, 2216 Chapala St.,
Santa Barbara, Calif. 93105
Filed Dec. 31, 1963, Ser. No. 334,887
12 Claims. (Cl. 242—84.2)

This invention relates to fishing reels of the general type disclosed in my Patent No. 2,834,559, issued May 13, 1958, wherein the spool on which the fish line is wound is mounted in a fixed position on an axis generally parallel to the casting rod and in which the line is played out parallel to said axis by unwinding with a peeling action from the forward end of the spool. Reels of this type are commonly known as "spinning reels." In my patented reel, a flyer or spinner in the form of a rotatable drum cooperates with the forward end of the spool to spin the line back onto the spool during a reeling-in operation, and this spinner carries at its forward end a snubber which cooperates with a throat in the forward end of the reel housing to grip the line for a "thumbing" action to arrest or brake the feeding movement of the line as circumstances may require in the operation of the reel. The present invention preserves these features in an improved form.

A principal object of this invention is to provide a spinning reel of this type wherein hand-cranking is dispensed with and reeling-in operations are effected by a battery powered electric drive motor. Supplementing this principal object, the invention contemplates the following specific objects:

(1) To simplify and improve the construction and operation of a spinning reel of the general type outlined above;

(2) To provide a simple, compact, coaxial arrangement of fixed spool, rotatable spinner, electric motor driving the spinner, and one or more batteries in energizing relation to the motor;

(3) To provide such a combination wherein the batteries are rechargeable and wherein the motor functions as a generator when its armature is reversely driven by the playing out of line as when being drawn out by a hooked fish;

(4) To provide an improved arrangement of axially shiftable, spring-retracted spinner having a snubber at its forward end, in combination with an improved thumbing lever having an actuator for effecting forward projection of the spinner to line-snubbing position;

(5) To provide an improved arrangement of fixed line-storage spool, rotatable spinner and retractable pickup finger in the periphery of the spinner, for spinning the line back into the spool during a reeling-in operation, the pickup finger being retracted to a non-obstructing position during the spinning of the line out of the spool and around the periphery of the spinner in a casting operation, and the arrangement being such as to almost completely eliminate any resistance to the playing out of the line during casting;

(6) To provide an improved arrangement of fixed storage spool, rotatable spinner and governor cooperating with the forward end of the spool;

(7) To provide an improved combination of spinner, electric motor for rotating the same in a reeling-in operation, electric power source and current-control means for varying the power of the motor so as to regulate line tension during reeling-in operation.

Other objects and advantages will become apparent in the ensuing specification and appended drawing in which:

FIG. 1 is a plan view of the handle-end of a casting rod equipped with a spinning reel embodying my invention;

FIG. 2 is an axial sectional view thereof taken on the line 2—2 of FIG. 1;

FIG. 3 is a transverse sectional view thereof taken on the line 3—3 of FIG. 2;

FIG. 4 is a detail sectional view of the push button switch for motor control, taken on the line 4—4 of FIG. 1;

FIG. 5 is a detail sectional view of the charging jack for connecting the batteries to an external charging source;

FIG. 6 is an exploded perspective view of the thumbing lever and spinner-shifting fork;

FIG. 7 is a schematic diagram of the electrical components of the reel;

FIG. 8 is a fragmentary detail sectional view of the periphery of the line-storage spool and associated parts;

FIG. 9 is a rear end view of a modified form of the spinner and pickup finger assembly; and FIG. 10 is a fragmentary sectional view of another modified form of the invention.

Referring now to the drawing in deail, I have shown therein, as an example of one form in which the invention may be embodied, a spinning reel apparatus embodied in the handle end of a casting rod 10, said reel apparatus comprising, in general, a line-storage spool A and a spinner-snubber unit B contained within a forward housing section C; a motor and generator unit D contained within an intermediate housing section E; a pair of batteries 11 and 12 contained within a elongated tubular rear housing section F which functions as a handle for the casting rod; a potentiometer G embodied in the rear end of the handle section F; a thumbing control apparatus H (FIGS. 2 and 6) mounted in the intermediate housing section E and operable for forwardly shifting the spinner-snubber unit B to snubbing position; a push button switch I (FIG. 4) likewise mounted in the intermediate housing section E, for closing a motor-energizing circuit; and a charging jack J (FIG. 5) for connecting the batteries to an external charging source.

Spool A has an annular rim channel 15 having a shallow axially projecting lip 16 at its forward end (FIG. 8); a radial web 17 at its rear end; a cylindrical bearing-mounting hub projecting forwardly from the center of web 17; and a motor-mounting collar 19 projecting rearwardly from an intermediate annular area of web 17. The rear flange 20 of rim channel 15, formed as an extension of web 17, is fitted in a shallow counterbore in a mounting ring 21 in which the flange 20 may be secured (e.g. by a press fit or by brazing or equivalent means). Mounting ring 21 in turn is secured on the forward end of intermediate housing section E as hereinafter described. Thus the spool A is fixedly attached to the forward end of housing section E.

Spinner-snubber unit B comprises a spinner disc 25 having a cylindrical rim 26 loosely fitted over the forward lip 16 of the spool rim 15; a sleeve 27 projecting forwardly from a central hub section 28 which has a cylindrical bore for mounting the unit B on the shaft of motor-generator unit D; a snubber head 29 mounted in the forward end of sleeve 27 and having a snubbing tip 30 of soft rubber, neoprene or the like at its forward end and a threaded stem 31 projecting rearwardly from its rear end for attachment to the motor shaft; a retainer cup 32 and washer 33 on the stem 31, the cup 32 receiving the forward end of the motor shaft; and a coil spring 34 retained within the sleeve 27 under compression between the cup 32 and the hub portion 28 of the spinner disc 25.

Attached to the rear face of spinner web 25 is a throw-out ring 35. Ring 35 is a flat ring of substantial axial thickness, solid except for radial slideways 36 and 37 in its forward side, in diametrically opposed relation, the slideway 36 being relatively narrow and the slideway 37 being relatively wide. Radially slidable in the slideway 36 is a pickup pin 38. The outer end of pin 38 is received in an aperture in the spinner rim 26. The inner end of pin 38 is positioned against the periphery of spool hub 18, which has on one side thereof a circumferentially extending arcuate recess 40 into which the inner end of pin 38 may drop so as to permit the pin to be retracted until its outer end is flush with the peripheral surface of rim 26. When the spinner unit B rotates, the pin 38 will be cammed out of the recess 40 onto the cylindrical periphery of hub 18, thus projecting the pin 38 to a position for engaging the fishing line where it traverses the periphery of rim 26.

In the slideway 37 is mounted the flat rectangular shank 41 of a governor having a head 42 which is extended through a slot 43 in the spinner rim 26. The governor has a pair of arcuate, circumferentially extending wings 44 which add weight thereto. The governor operates with a centrifugal action, its head 42 riding against the inner surface of forward housing section C with a braking action.

Pickup pin 38 and governor shank 41 are confined between the throw-out ring 35 and the rear face of spinner unit B, but with sufficient clearance for free-sliding operation. Either the pickup pin 38 or the governor head 42 may function to engage and spin the line 34.

Housing section C comprises a generally conical shell 50 having a cylindrical skirt 51 that is internally threaded for coupling to an external thread on mounting ring 21, at 52. At its forward end, shell 50 is provided with a throat 53 for ingress and egress of a casting line 54. From the throat 53, the line 54 extends diagonally at 55 around the rim 26 of spinner unit B. From the rear end of rim 26, which normally overhangs the spool rim 15 slightly less than half its width, the line extends inwardly to the coils of line wound upon the spool within the rim 15.

An integral boss 56 projects forwardly from one side of the shell 40, spaced laterally from the major longitudinal axis of the reel, in non-interfering relation to the line 44 issuing through the throat 43, and provides a socket in which the rear end of the casting rod 10 is mounted.

Defined between the spinner rim 26 and the cylindrical skirt 51 of forward housing section C is a narrow cylindrical passage 57 through which the line 54 passes to and from the reeling channel 15 of the spool. During a casting operation, the pickup pin 38 and governor head 42 are retracted so as to leave the passage 57 unobstructed, permitting the line to spin circumferentially around the rim of the spinner (stationary during this operation) with the diagonal portion 55 describing a conical path and the body of the line 54 passing axially through the throat 53. Retraction of the pickup pin 38 and governor is effected by projecting the spinner unit B forwardly by operation of thumbing apparatus H, causing the ends of the pickup pin and governor to be cammed inwardly by sliding against the forwardly and inwardly tapering conical inner surface of the housing shell 50. The projected position of the spinner unit is indicated in broken lines in FIG. 2. After thus retracting the pickup pin and governor, the thumbing apparatus H is released so as to open the annular passage 57 for free spinning of the line therein.

During a reeling-in operation, in which the spinner unit B is rotated by motor-generator D, the pickup pin 38 will be projected by being cammed out of the circumferential recess 40 as previously described and will thereupon extend across the annular passage 57, picking up the line 54 and spinning it around the spool channel 15, laying the line down in coils in the channel. Governor unit 41–43 will be projected by centrifugal force and will effect a braking action against the housing skirt 51 proportional to the speed of rotation, thus providing a governing action.

Motor-generator unit D is of a very small, compact type commonly utilized in electric shavers, etc. and embodying in general a field portion 57 consisting of a permanent magnet of split-cylinder form mounted in the collar 19 of spool A, an armature 58, and a shaft 59 journalled in bearings mounted as shown within the spool hub 18, the snubber stem 31 being threaded into the forward end of the shaft 59 and thus holding the spinner and motor parts in assembly. The rear end of shaft 59 may be journalled in a rear end cap 57', cooperating with the field collar 57 in providing a casing for the motor. Rear end cap 57' also carries a terminal for contact with the pole of forward battery 11. The unit D is characterized by its capacity to function as a generator when power-driven. Accordingly, in the event the line 54 is reeled out rapidly by a strong pull of a hooked fish, the engagement of the line against either the pickup pin or the governor head 42 in a projected position thereof will transmit rotation to the armature 58 of unit D which will then function as a generator for recharging the batteries 11, 12. In the event both the pickup pin and the governor are retracted at the beginning of such a playout of the line, the fisherman can effect projection of the pin 38 by momentarily closing the circuit to the motor generator unit D so as to briefly rotate the spinner unit B, until it is picked up and rotated in the reverse direction by the driving engagement of the line against the pin 38.

Shaft 59 has a suitable axially slidable driving connection with the spinner sleeve 27 which may take the form of a keyed connection between the shaft and the spinner hub 28 or a keyed connection between a periphery of washer 33 (secured to the shaft) and a keyway 33' in sleeve 27.

Housing section E includes a frusto-conical body 60 having at its rear end an internally threaded collar 61 in which the handle section F is mounted; having an aperture 62 disposed near its forward end and having at its forward end an inwardly offset annular shoulder portion 63 on which the mounting ring 21 is mounted.

Handle section F of the housing comprises a length of cylindrical tubing 70 having its forward end threaded into the coupling collar 61 of housing section E, a hand-grip sleeve 71 of suitable grip material such as leather or equivalent plastic material, cemented to and covering the tube 70; a flaring collar 72 threaded onto the rear end of tube 70 and having a radially inwardly projecting annular lip 73, and a potentiometer core 74 having a peripheral flange 75 secured between the lip 73 and the end of tubing 70. The core 74 has an axial bore in which is rotatably mounted a flanged stud 76 the forward end of which provides a pilot for locating a coil spring 77 under compression between the base of the rear battery cell 12 and the flange of the stud 76. Spring 77 also functions as an electrical connection between the housing and the base of battery cell 12.

Potentiometer G comprises the end collar 72, the core 74, a resistor coil 80 encircling and mounted upon the periphery of the rear end portion of core 74; a ground connection 81 from one end of coil 80 to the housing through its end collar 72; a wiper finger 82 contacting the resistor coil 80, a control knob 83 having a forwardly projecting hub 84, and a fastener screw 85 extending through hub 84, threaded into the stud 76, extending through an aperture in a hub ring of wiper finger 82, and clamping the latter between the hub 84 and the rear end of stud 76. Stud 76 is freely rotatable in the bore of core 74 and thus functions as a trunnion for the knob 83, providing for rotating the knob so as to cause the wiper finger 82 to wipe the coils of resistor coil 80. Potentiometer core 74 is of insulating material so as to provide a suitable insulator mounting for the coil 80.

Thumbing apparatus H comprises a bell-crank lever 90 having a bifurcated fulcrum portion 91 (FIG. 6) pivotally mounted on a pivot pin 92 which in turn may be mounted in an ear 93 of intermediate housing section E; a thumbing button 94 on an outer end of bell crank 90, projecting through housing aperture 62; an arm 95 projecting forwardly from the inner end of bell crank 90 and having a pair of apertured, internally threaded, inturned ears 96; and a fork 97 of semicircular arch form secured to the forward end of the bell crank arm 95 by screws 98 extended through the fork and threaded into ears 96, the respective arms of the fork 97 straddling the spool hub 18 and having forwardly embossed bearing dimples 99 for engagement against the rear face of throw-out ring 35.

It will now be apparent that by thumbing inwardly on the button 94, the bell crank 90 will be rocked clockwise as viewed in FIG. 2, pressing the fork 97 forwardly against the throw-out ring 35 and thus projecting the spinner-snubbing unit B forwardly. Such forward projection is utilized for retracting the pickup pin 38 and governor 41–43 as previously described; also for projecting the snubber tip 30 into the throat 53 so as to grip the line 54 between the pad 30 and the wall of the throat to effect a snubbing or braking (commonly known as "thumbing") action on the line 54 when being forcibly pulled from the reel by a hooked fish. The intensity of braking action can be regulated by the amount of pressure applied to the button 94.

Arm 95 extends forwardly through an aperture 100 in the spool web 17.

Control switch I (FIG. 4) comprises a spring blade 105 secured at one end to housing body 60 by a terminal screw 106, a button 107 secured to the other end of the blade 105 and projecting through an aperture in housing body 60; and a fixed contact 108 secured by a terminal screw 109 to the housing body 60. At this point it should be noted that housing section 60 can be of insulating material (e.g. stiff phenolic resin plastic or equivalent) or the terminal screws 106 and 109 can be mounted in suitable insulator grommets (not shown) in a housing wall of metal.

Charging jack J comprises a brush 110 of spring ribbon metal secured by a terminal screw 111 to a boss 112 in housing section E, a radial socket bore 113 in housing section E directly below the brush 110; and a jack prong 114 on an insulated shank 114' which is insertable in the socket 113 to engage prong 114 with the brush 110.

Referring now to FIG. 7, the respective terminals of switch I have respective conductor connection 115 and 116 to the forward battery cell 11 and to the motor unit D respectively. Connection 115 may comprise a conductor connecting one side of the switch to a contact in the rear end cap 57' of the motor. Connection 116 is a connection to one of the slip rings of the motor, the other being connected to ground (e.g. by being connected to handle sleeve 70). In parallel with connection 115 is a connection 115' to the charging jack brush 110. The rear battery cell 12 is connected through spring 77 and stud 76 to the potentiometer wiper 82, this connection being designated 76 in FIG. 7. Front end of coil 80 is connected to ground (e.g. handle sleeve 70) at 81 as previously described. Thus there are provided parallel circuits to the motor D through the batteries 11, 12 and switch I on the one hand; and from the charging jack J on the other hand.

Operation of the reel will be largely understood from the foregoing detailed description and will be only summarized at this point. With the motor circuit open and the spinner unit B accordingly stationary, the operator can clear the periphery of the spinner rim 26 of the projections 38, 42, if necessary, by thumbing the button 94 and thus projecting the spinner B forwardly. The pressure will be maintained on thumbing unit H so as to hold the line 54 locked in the throat 53 by the snubbing tip 30 while the casting rod is swung in a casting throw. At the proper point during the swing, determined by experiments, the fisherman will release the thumbing unit H, permitting the weighted end of the line to draw the line forwardly in a spinning operation in which it is spun out of the reeling channel 15.

To retract the line, it is only necessary to press the switch button 107, energizing the motor unit D and thus rotating the spinner unit B. The initial rotation of the spinner unit will cause the pickup pin 38 to be projected by camming action on screw hub 18 as previously described, and as the projected pin 38 orbits around the reeling channel 15 adjacent its lip 16, it will encounter the line 54 where it crosses the rim 26, will pickup the line and spin it around the reeling channel 15 of the spool and into the spool as previously described.

In playing a hooked fish, the motor will be energized to reel in the line whenever the pull on the line is relaxed, and by keeping the motor circuit closed during the intervals when the line is being dragged out by the fish, the resultant reverse driving of the motor will cause it to function as a generator for recharging the batteries, while at the same time resisting the outward playing of the line. The reaction of the motor to any release of tension in the line will be automatic and substantially instantaneous in resuming the reel-in operation, and considerably faster than the manual reaction of a fisherman operating a manual reel.

FIG. 9 discloses a modified form of pickup pin 38a for spinner B, formed as an integral finger on a bell crank having an arm 121 extending at an acute angle from finger 38a and pivoted on a pivot 122 to the spinner web 25, the angle between finger 38a and arm 121 being such that the finger 38a moves substantially longitudinally, in a radial direction with reference to the axis of spinner B, in a circumferentially elongated slot 123 in the spinner rim 26. The bell crank 38a, 121 swings freely on the pivot 122 in response to centrifugal force. Pickup finger 38a, in response to any rotation of the spinner, will be projected from the periphery of rim 26 into the annular passage 57 to engage the line 55. Also, the bell crank 38a, 121 may function as a centrifugal governor, the end of finger 38a engaging the skirt 51 of housing shell C.

FIG. 10 illustrates another modified form of the invention, wherein automatic projection of the spinner B' to a forward position is provided for. Spinner B' is provided on its rearward side with crown ratchet teeth 125 disposed inwardly of spool channel 15a and engaged by the swinging end of a pawl 126. Pawl 126 is fulcrumed on a pivot 127 carried by an ear 128 projecting forwardly from web 117 of reel spool A'. Pawl 126 is in the form of a bell crank having a stop finger 129 positioned for abutting engagement with the forward end face of web 17 to locate the pawl 126 normally in a position projecting perpendicular to the common plane of ratchet teeth 125 shown in FIG. 10. The pawl is biased to this position by the light yielding action of a loading spring 130. In the arrangement shown in FIG. 10, the spinner B' will rotate only in the direction for winding the line 55 into the spool channel 15a, as indicated by the arrow 131. When the spinner is thus being rotated by the motor D, the teeth 125 will ratchet against the pawl 126, the latter tilting against the yielding resistance of spring 130 to permit the teeth 125 to pass, and to allow the spinner B' to shift rearwardly, thus allowing the pick-up finger (e.g. 38 of FIG. 3) to project to operative position. Automatic retraction of the spinner B' is provided for by the loading spring 34 of FIG. 2. As in the arrangement of FIG. 2, when the spinner B' is in the retracted position, the inner end of the pickup finger will be aligned with the cam 18 and its recess 40 so as to be cammed outwardly to operative position, whereas when the spinner is in its forwardly projected position, for casting, alignment with the cam is not required, and the pin 38, having been retracted in the thumbing operation, will remain retracted, since the spinner is not rotated during casting, and the pin will accordingly not be submitted to centrifugal force.

The invention contemplates incorporating the manual thumbing apparatus H of FIG. 2 in the FIG. 10 modification although it is not shown therein. Accordingly, in a casting operation, the spinner B' can be pressed forwardly slightly beyond the forwardly projected position seen in FIG. 10, to grip the line 55 between the thumbing pad 30 and the throat 53. Release of the thumbing button H will permit the spinner B to retract to the position shown in FIG. 10, in which the line 55 is released for free travel through the throat 53. The line 55 can then unreel from the spool A', spinning around the smooth peripheral surface of spinner B'. During the casting operation, the spinner B' will be held in the forwardly projected position of FIG. 10 by the pawl 126 so that the unreeling of the line 55 from the spool channel 15a will not be obstructed.

The spool channel 15a of FIG. 10 is of greater axial width than the channel 15 of FIG. 2.

I claim:

1. A fisherman's spinning reel comprising, in combination: a support; a line storage spool fixed to the support; a spinner rotatable adjacent the forward end of the spool and having peripheral means for engaging the line and spinning it into the spool; a combination motor and generator having a driving connection to the spinner for powered rotation thereof; and storage battery means having connections to said motor for energizing the same for a reeling-in operation and for recharging said battery means upon generator operation of said motor when reversely driven by unreeling of said line when pulled by a hooked fish; a housing having a rearward tubular handle portion, said storage battery means comprising a plurality of cells contained in said handle portion in end-to-end alignment; an enlarged housing portion containing said motor, said spool and said spinner, and having at its forward end a throat for ingress and egress of said line; and a motor-control potentiometer on the rear end of said tubular handle portion of the housing including a rotatable knob functioning as a rear end closure for said handle portion and also for effecting potentiometer adjustments on the motor circuit.

2. A fisherman's spinning reel comprising, in combination: a support attachable to a casting rod; a line-storage spool fixed to said support with its axis substantially parallel to the casting rod as fixed to the support; a spinner associated with a forward side of said spool, said spinner including a radial pickup pin mounted for projection past its periphery to engage the line for spinning it into said spool; means mounting said spinner to the forward end of said spool for spinning rotation and for axial projection forwardly away from the spool; manually operable means for effecting said axial projection of the spinner; said support including annular means encircling the periphery of said spinner and normally defining therewith a radially narrow annular passage for travel of a fishing line to and from said spool, said annular means having an inner wall with a generally conical taper narrowing forwardly and cooperable with a camming action against the outer end of said pickup pin for retracting it inwardly to a non-interfering position with respect to said line in response to said forward projection of the spinner; means yieldingly biasing said spinner for return movement to a normal position in spinning relation to said spool and means responsive to rotation of the spinner when in said normal position, for projecting said pickup pin radially to line-engaging position; said spinner including a snubber-support sleeve projecting forwardly from its center, said biasing means consisting of a coil spring housed within said sleeve and having a rear end in spring-loaded engagement with said spinner.

3. A reel as defined in claim 2, further including an electric motor mounted rearwardly of said spool and having a shaft projecting through the spool and through said coil spring; and a member secured to the forward end of said shaft and providing an abutment for the forward end of said spring.

4. In a fisherman's spinning reel: a housing including a forward portion having at its forward extremity a throat for ingress and egress of a fishing line; a spool fixed in said housing rearwardly of said forward end and having a peripheral annular channel for storage of said line; a spinner having a rim normally overhanging said channel; a motor mounted at the rear end of said spool and having a shaft extending through the spool on the axis of said throat, slidably mounting said spinner for axial projection toward said throat and for rotation around said spool, and drivingly connected thereto; said spinner including a pickup pin mounted therein for radial projection through its rim to engage a portion of said line extending across said rim between said spool and said throat and for spinning said line into said spool channel when driven by said motor; said housing including a skirt portion slightly spaced radially from said spinner rim to define a shallow annular passage through which said line may pass in crossing said rim, and having an inner wall with a generally conical taper narrowing forwardly toward said throat, said pickup pin being engageable against said tapering inner wall and thereby cammed inwardly in non-projecting relation to said spinner rim in response to forward projection of said spinner; and manually operable means for effecting said forward projection of the spinner.

5. A spinning reel as defined in claim 4, wherein said spool has a hub in which the shaft of said motor is journalled, said hub having a circular periphery interrupted by an arcuate circumferentially extending recess positioned to receive the inner end of said pin when retracted inwardly, and operable to cam said pin outwardly to projected position in response to resumed rotation of said spinner.

6. A spinning reel as defined in claim 5, wherein said spinner includes a stem projecting forwardly on its rotational axis, and a snubber tip carried by the forward end of said stem in a position normally spaced rearwardly from but adjacent to said throat, and such that forward projection of said spinner will engage said snubber tip in said throat for thumbing grip of the line where it passes through said throat.

7. A fisherman's spinning reel comprising an electrical motor, a line storage reel and a spinner arranged on a common axis of rotation of said spinner; a housing containing and supporting said motor, spool and spinner, and spool being fixed in said housing forwardly of said motor and said spinner being disposed adjacent the forward end of said spool and having a rim normally overhanging the periphery of said spool; said motor having a shaft extending through said spool and having a driving connection to said spinner for rotating the same to spin said line into said spool; said spinner having a sleeve portion projecting forwardly from its center and provided with a snubber tip at its forward end; said housing including a generally conical forward portion provided at its forward extremity with a throat for egress and ingress of said line, said throat being adjacent and coaxial with said snubber tip, said tip being secured to the forward end of said motor shaft; a coil spring housed within said sleeve and under compression between said snubber tip and said spinner for spring-loading the latter rearwardly to a normal position in spinning relation to said spool; and manually operable means for projecting said spinner forwardly to effect thumbing grip of said line in said throat by said tip.

8. A spinning reel as defined in claim 7, wherein said housing includes a tubular handle portion and a bell-shaped intermediate portion flaring forwardly from said handle portion, connecting the latter to said forward housing portion and enclosing said motor; and wherein said manually operable means comprises a bell-crank pivoted in said intermediate housing portion adjacent said spool and having a thumbing button projecting through an aperture in said intermediate housing portion, said bell-crank including an arm projecting forwardly through an aperture in said spool and provided with a fork engaging the rear end of said spinner for effecting said forward projection.

9. A spinning reel as defined in claim 8, wherein said spool includes a forwardly projecting hub straddled by said fork, and bearing means within said hub, in which said motor shaft is journalled.

10. A spinning reel as defined in claim 9, including a throw-out ring secured to the rear end of said spinner and providing a bearing surface against which said fork engages to effect said spinner projection; said throw-out ring having radial guide grooves in its forward side; and a pickup pin and governor element each radially slidable in a respective guide groove and confined between said guide ring and the face of said spinner.

11. Fisherman's spinning reel apparatus comprising: an elongated housing having a forward portion provided with means for attachment thereof to a casting rod spaced radially from the major longitudinal axis thereof, and having at the forward extremity thereof, on said major axis, a throat for egress and ingress of a fishing line; a line-storage spool fixed in said housing rearwardly of said forward extremity; an electric motor mounted at the rear end of said spool and having a shaft projecting forwardly through the spool; a spinner mounted on said shaft adjacent the forward end of said spool and normally in adjacent, spinning relation to said spool, said motor shaft having a driving connection to said spinner for rotating the same so as to spin said line into said spool across the periphery of said spinner; the connection between said spinner and said shaft providing for axial projection of said spinner forwardly from said spool; a centrifugal governor element mounted on the rear face of said spinner for centrifugally energized radial projection into braking engagement with the inner wall of said housing; said inner housing wall having a conical forward taper such that said centrifugal governor will be retracted inwardly by camming engagement therewith in response to the forward projection of said spinner; and manually operable means for effecting said forward projection.

12. A spinning reel as defined in claim 11, including spring means acting between the forward end of said shaft and said spinner for normally yieldingly biasing said spinner to said spinning position with relation to said spool.

References Cited

UNITED STATES PATENTS

| | | |
|---|---|---|
| 2,541,876 | 2/1951 | Lockwood. |
| 2,675,192 | 4/1954 | Hull _____ 242—84.2 |
| 2,834,559 | 5/1958 | Nagy _____ 242—82.21 |
| 2,862,679 | 12/1958 | Denison et al. _____ 242—84.2 |
| 2,866,291 | 12/1958 | Duell. |
| 2,896,875 | 7/1959 | Reed et al. _____ 242—84.1 |
| 2,903,201 | 9/1959 | Sarah _____ 242—84.2 |
| 2,911,165 | 11/1959 | Sarah _____ 242—84.2 |
| 2,918,227 | 12/1959 | Mauborgne _____ 242—84.21 |
| 3,029,040 | 4/1962 | Wood _____ 242—84.2 |
| 3,032,290 | 5/1962 | Wallace _____ 242—84.21 |
| 3,248,819 | 5/1966 | Stealy _____ 242—84.1 |

FOREIGN PATENTS 803,361   6/1961   Japan.

FRANK J. COHEN, *Primary Examiner.*

B. S. TAYLOR, *Assistant Examiner.*